United States Patent Office 3,823,196
Patented July 9, 1974

---

3,823,196
PRODUCTION OF CYCLIC TRIMERS OF 1,3-DIENES
Hiroyuki Morikawa and Takao Saito, Ami, Japan, assignors to Mitsubishi Petrochemical Company Limited, Tokyo-to, Japan
No Drawing. Filed June 7, 1971, Ser. No. 150,802
Claims priority, application Japan, June 18, 1970, 45/52,395
Int. Cl. C07c 3/00
U.S. Cl. 260—666 B           9 Claims

ABSTRACT OF THE DISCLOSURE

A 1,3-diene is caused to contact a catalyst system comprising, in combination: a titanium compound $$Ti(O-R-Cl)_n Cl_{4-n}$$

(where R is an alkylene, cycloalkylene, chloroalkylene or chlorocycloalkylene group of $C_2$ to $C_{15}$, and $n$ is 1 or 2); an organoaluminum compound $AlR'_m Cl_{3-m}$ (where $R'$ is an alkyl group of $C_1$ to $C_{10}$, and $m$ is 2 or 1.5); and an additive which is a sulfoxide $SOR''_2$ (where $R''$ is an alkyl or aralkyl group of $C_1$ to $C_{10}$) or a mixture thereof and a phosphine oxide $POR'''_3$ (where $R''$ is an alkyl, aralkyl, or alkoxy group of $C_1$ to $C_{10}$), the 1,3-diene thereby undergoing cyclic trimerization whereby a cyclic trimer of low content of high polymers is produced at high reaction velocity and with high selectivity.

BACKGROUND OF THE INVENTION

This invention relates generally to the production of oligomers of 1,3-dienes and more particularly to a new and advanced process for producing cyclic trimers of 1,3-dienes while suppressing the formation of high polymers.

The terms "oligomers" and "trimers" as used throughout this disclosure are intended to include, respectively, homooligomers and cooligomers and homotrimers and cotrimers.

It is known to synthesize cyclic trimers of 1,3-dienes by using Ziegler-type catalysts comprising combinations of titanium compounds and organoaluminum compounds. More specifically, examples of use of titanium halides and alkoxides are disclosed in Japanese Pat. Publication No. 2372/1960 $TiCl_4$—$AlEt_2Cl$), Japanese Pat. Publication No. 7765/1964 ($Ti(OC_4H_9)_4$—$AlEt_2Cl$), Japanese Pat. Publication No. 19331/1965 ($Ti(C_5H_7O_2)_2Cl_2$—$AlEt_2Cl$), and other publications.

These Ziegler-type catalyst comprising titanium compounds and organoaluminum compounds have extremely high activity in comparison with nickel catalysts and are therefore advantageous.

However, these Ziegler-type catalysts simultaneously have high activity also for the formation of high polymers and thereby have the disadvantage of readily causing the formation of by-products other than the objective oligomers.

Accordingly, with the object of overcoming this drawback, a method of adding compounds having semipolar double bonds to catalyst systems of titanium halides and alkylaluminum halides (as disclosed in the Japanese Patent Publication No. 17974/1962) and a method of adding Lewis bases (as disclosed in the Japanese Pat. Publication No. 22656/1965) have been proposed. The modification effect due to these additives is indicated as respectively differing depending on the type of the titanium compound.

Among catalyst systems in which additives are used, there has been a tendency for those of good selectivity of cyclic trimers to produce a low reaction velocity and those of high reaction velocity to have poor selectivity.

SUMMARY OF THE INVENTION

It is an object of this invention to overcome the above described difficulties encountered in the prior art in providing a new and advanced process for producing cyclic trimers of 1,3-dienes with low content of high polymers. This object and other objects of this invention have been achieved through the use of catalysts comprising combinations of specific titanium compounds, specific organic aluminum compounds, and specific additives.

According to this invention, briefly summarized, there is provided a process for producing cyclic trimers of 1,3-dienes wherein a 1,3-diene is caused to undergo cyclic trimerization by contacting a catalyst system comprising, in combination: a titanium compound (I) representable by the general formula $$Ti(O-R-Cl)_n Cl_{4-n}$$

where R is an alkylene group, a cycloalkylene group, a chloroalkylene group or a chlorocyclo alkylene group of from $C_2$ to $C_{15}$, and $n$ is 1 or 2; an organoaluminum compound (II) representable by the general formula $AlR'_m Cl_{3-m}$ where $R'$ is an alkyl group of from $C_1$ to $C_{10}$, and $m$ is 2 or 1.5; and an additive (III) which is a sulfoxide (III–1) representable by the general formula $SOR''_2$ where $R''$ is an alkyl group or an aralkyl group of from $C_1$ to $C_{10}$ or a mixture of a sulfoxide (III–1) and a phosphine oxide (III–2) representable by the general formula $POR'''_3$ where $R'''$ is an alkyl group, an aralkyl group, or an alkoxy group of from $C_1$ to $C_{10}$.

The nature, principle, and utility of this invention will become more clearly apparent from the following detailed description beginning with a consideration of general aspects and features of the invention and concluding with specific examples of practice illustrating preferred embodiments thereof.

DETAILED DESCRIPTION

As summarized briefly hereinabove, the catalyst system according to this invention comprises a combination of specific constituents or components. Heretofore, nothing has been known with respect to the catalytic effect of titanium compounds having chloroalkoxy ligands of this type. Furthermore, the effectiveness of adding a specific sulfur compound or a mixture thereof with a specific phosphorus compound to this catalyst system has heretofore been totally unknown.

We have found that through the use of a catalyst system of the composition according this invention, cyclic trimers of 1,3-dienes can be produced at a high reaction velocity, with high selectivity, and with only a small quantity of by-product high polymers.

CATALYST

Component I

One (component I) of the components of the catalyst system used in this invention to produce high desirable effects is a titanium compound representable by the general formula $Ti(O-R-Cl)_n Cl_{4-n}$, where R is an alkylene group, a cycloalkylene group, chloroalkylene group or chlorocycloalkyelne group of a number of carbon atoms from 2 to 15, and $n$ is 1 or 2. A chloroalkoxytitanium chloride representable by this general formula, in general, has the characteristics of solubility, high catalytic stability, and, at the same time, high activity for formation of oligomers.

A titanium compound of this character is prepared by reaction of $TiCl_4$ and a corresponding alkylene oxide by utilizing the process set forth in the United States Pat. No. 2,709,174. More specifically, such a titanium compound can be readily produced by any one of the reactions as indicated below, for example,

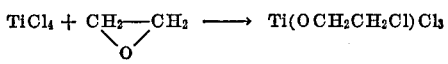

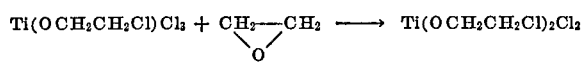

The number of chloroalkoxy ligands for producing the optimum catalytic effect in terms of $n$ is 1 or 2, while a value of $n$ of 3 or 4 lowers the activity of the catalyst for oligomer production. Substitution of ethylene oxide by a cycloalkylene oxide preferably of $C_4$ to $C_8$ from the view point of cyclododecatriene yield, such as cyclohexene oxide, produces a corresponding chlorocycloalkylenoxytitanium chloride.

Examples of such compounds are:

chloroethoxytrichlorotitanium [Ti(OC$_2$H$_4$Cl)Cl$_3$], synthesized from ethylene oxide and titanium tetrachloride;
di(chloroethoxy)dichlorotitanium[Ti(OC$_2$H$_4$Cl)$_2$Cl$_2$], synthesized from chloroethoxytrichlorotitanium and ethylene oxide;
chloropropoxytrichlorotitanium[Ti(OC$_3$H$_7$Cl)$_2$Cl$_2$], synthesized from propylene oxide and titanium tetrachloride;
di-(chloropropoxy)dichlorotitanium[Ti(OC$_3$H$_7$Cl)$_2$Cl$_2$], synthesized from chloropropoxytrichlorotitanium and propylene oxide;
chlorobutoxytrichlorotitanium[Ti(OC$_4$H$_8$Cl)Cl$_3$], synthesized from butylene oxide and titanium tetrachloride;
dichloropropoxytrichlorotitanium [Ti(OC$_3$H$_5$Cl$_2$)Cl$_3$], synthesized from epichlorohydrin and titanium tetrachloride; and
chlorododecenyltrichlorotitanium[Ti(OC$_{12}$H$_{24}$Cl)Cl$_3$], synthesized from dodecene oxide and titanium tetrachloride.
chlorocyclobutenoxytitanium trichloride
chlorocyclopentenoxytitanium trichloride
chlorocyclohexenoxytitanium trichloride
chlorocyclooctenoxytitanium trichloride
di-(chlorocyclobutenoxy) titanium dichloride
di-(chlorocyclopentenoxy) titanium dichloride
di-(chlorocyclohexenoxy) titanium dichloride
di-(chlorocyclooctenoxy) titanium dichloride These compounds can be used singly or as mixtures of two or more thereof.

Component II

The second component (component II) of the catalyst according to this invention is an alkylaluminum chloride representable by the general formula AlR$'_m$Cl$_{3-m}$, where R$'$ is an alkyl group of from $C_1$ to $C_{10}$, and $m$ is 2 or 1.5. Examples of such compounds are:
dimethylaluminum chloride;
methylaluminum sesquichloride;
diethylaluminum chloride;
ethylaluminum sesquichloride;
diisobutylaluminum chloride;
butylaluminum sesquichloride; and
dioctylalumminum chloride.

These compounds can be used singly or as mixtures of two or more thereof.

Component III

The third component (component III) of the instant catalyst is a sulfoxide used singly or is a combination of a sulfoxide and a phosphine oxide type compound. It is our conclusion that the use of this component III produces the effect of suppressing the by-production of high polymers and increasing the reaction velocity.

(1) Sulfoxides

First, the sulfoxide is a compound representable by the general formula SOR$''_2$, where R$''$ is an alkyl group or an aralkyl group of from $C_1$ to $C_{10}$. Examples of such compounds are:

dimethyl sulfoxide;           dibutyl sulfoxide; and
dipropyl sulfoxide;           diphenyl sulfoxide.

These compounds can be used singly or as mixtures of two or more thereof.

(2) Phosphine oxides

A phosphine oxide type compound to be used together with the sulfoxide is a compound representable by the general formula POR$'''_3$, where R$'''$ is an alkyl group, an aralkyl group, or an alkoxy group. Examples of such compounds are:

trimethylphosphine oxide      trimethyl phosphate
triethylphosphine oxide       triethyl phosphate
tripropylphosphine oxide      tributyl phosphate
tributylphosphine oxide       triphenyl phosphate
triphenylphosphine oxide      tricresyl phosphate
tricresylphosphine oxide These compounds can be used singly or as mixtures of two or more thereof.

Ratio of the components

The ratio of the quantities of the titanium compound (I) and the aluminum compound (II) used in the catalyst system of this invention can be varied over a wide range. For example, the range in terms of mole ratio of Al compound/Ti compound=1 to 100, preferably 3 to 10.

The quantity of the additive (III) in terms of mole ratio is as follows. In the case of a sulfoxide or a mixture of sulfoxides, by itself, S compound/Ti compound=0.01 to 4, preferably 0.1 to 1. In the case where one or more sulfoxides and one or more phosphine oxides are used together, (P compound, S compound)/Ti compound=0.01 to 4, preferably 0.1 to 1.

The composition of the additive mixture, in terms of mole ratio, is in the range of P compound/S compound=0.1 to 10, preferably 0.3 to 3.

Preparation

In the preparation of the catalyst, the additive (III) may be added to each of the other components of the catalyst, or it may be added before or after admixing of the titanium compound and the aluminum compound. Ordinarily, the preferable procedure is to add the aluminum compound to a mixed solution of the titanium compound and the additive.

TRIMERIZATION

While a cyclic trimerization reaction due to the catalyst system can be carried out irrespective of the presence or absence of a solvent medium, it is ordinarily suitable to carry out the reaction in the presence of a solvent. Examples of preferable solvents for this purpose are aromatic hydrocarbons such as benzene, toluene, and xylene and aliphatic hydrocarbons such as hexane and heptane.

While the temperature of the cyclic trimerization reaction can be varied within a range of from 0 to 100° C., a preferable range is from 20 to 70° C. The reaction can be carried out under atmospheric pressure or higher pressure.

Examples of 1,3-dienes which are monomers to undergo cyclic trimerization are butadiene-(1,3), isoprene, pentadiene-(1,3), and mixtures thereof. Furthermore, the term "1,3-dienes" is herein interpreted to include low-grade or impure butadiene-(1,3) mixtures (e.g., plant BB fraction) containing olefins, such as butene-1 and butene-2, up to 25 to 90% by mole of butadiene-1,3. We have found that when the process according to this invention is carried out with the use of these 1,3-diene mixtures and low-grade or impure dienes as starting materials, cyclic homotrimers and cyclic cotrimers can be produced in a particularly satisfactory manner, while the formation of by-product reaction products is suppressed.

EXAMPLES

In order to indicate more fully the nature and utility of this invention, the following comparative example based on experiments and specific examples of practice constituting preferred embodiments of the invention are set forth, it being understood that these examples are presented as illustratively only and that the details set forth therein are not intended to limit the scope of the invention.

Comparative Example

Reaction conditions—1 millimole of the titanium compound, 5 millimoles of diethylaluminum chloride, 50 cc. of benzene, reaction temperature of 40° C., and reaction time of 3 hours.

Under the above reaction conditions, reactions were carried out with the following starting materials.

| Experiment No. | Starting material |
|---|---|
| Exp. 1 | 1,3-butadiene (12 g.) |
| Exp. 2 | butadiene (14 g.)+pentadiene (9 g.) |
| Exp. 3 | BB fraction* (30 g.) |

*Composition of the BB fraction:

| | Percent |
|---|---|
| Propylene | 0.9 |
| Methylacetylene | 0.4 |
| Butane | 8 |
| Isobutane | 2 |
| Butene-1 | 17 |
| Isobutylene | 28 |
| Butene-2 | 6 |
| Butadiene | 37 |
| Others | Remainder |

| Titanium compound | Chloroethoxytrichlorotitanium (this invention) | | Tetraethoxytitanium | Tetrachlorotitanium |
|---|---|---|---|---|
| Additive quantity (millimole): | | | | |
| Dimethyl sulfoxide | 0.2 | 0.2 | 0.2 | 0.2 |
| Triphenylphosphine oxide | 0.2 | | 0.2 | 0.2 | 0.2 |
| Cyclic trimer yield (weight percent): | | | | |
| Example: | | | | |
| 1 | 92 | 83 | 75 | 45 | 76 |
| 2 | 73 | 58 | 38 | 36 | 48 |
| 3 | 83 | 71 | | | 40 |

Example 1

A pressure-resistant bottle of 150-cc. capacity is purged with nitrogen and charged with 50 cc. of benzene, 1 millimole of chloroethoxytrichlorotitanium, 0.2 millimole of triphenylphosphine oxide, 0.2 millimole of dimethyl sulfoxide, 5 millimoles of diethylaluminum chloride, and 12 g. of butadiene. The resulting mixture is then agitated for 3 hours at 40° C.

Thereafter, a methanol solution is added to the process material to decompose the catalyst, and, after concentration of the solvent, fractional distillation of the resulting process materials is carried out under reduced pressure.

As a result, 11 g. of a cyclododecatriene-(1,5,9) fraction having a boiling point of from 65 to 70° C. (at 3 mm. Hg) is obtained. This quantity corresponds to a yield of 92 percent with respect to the monomer charged.

Example 2

The procedure according to Example 1 is followed except for the use of a mixture of 14 g. of butadiene and 9 g. of pentadiene for the monomer.

As a result, 16.8 g. of a cyclic trimer fraction of a boiling point of from 50 to 100° C. at 2 mm. Hg, is obtained, yield being 73 percent. The composition of this cyclic trimer fraction is as follows.

| | Percent |
|---|---|
| Methylcyclododecatriene | 52 |
| Dimethylcyclododecatriene | 2 |
| Cyclododecatriene | 46 |

Example 3

The process set forth in Example 1 is carried out with the use of 50 cc. of benzene, 1 millimole of di-(chloroethoxy)dichlorotitanium, 0.15 millimole of triphenylphosphine oxide, 0.15 millimole of dimethyl sulfoxide, 5 millimole of diethylaluminum chloride, and 12 g. of butadiene.

As a result, 10.8 g. of cyclododecatriene-(1,5,9) is obtained, yield being 90%.

Example 4

The process according to Example 3 except for the use of a mixture of 14 g. of butadiene and 9 g. of isoprene as the monomer is carried out.

As a result, 17.2 g. of a cyclic trimer fraction is obtained, yield being 75%. The composition of this trimer fraction is as follows.

| | Percent |
|---|---|
| Methylcyclododecatriene | 41 |
| Dimethylcyclododecatriene | 1 |
| Cyclododecatriene | 58 |

Example 5

A process similar to that of Example 1 is carried out with the use of 50 cc. of benzene, 1 millimole of chloropropoxytrichlorotitanium, 0.1 millimole of triphenylphosphine oxide, 0.2 millimole of diphenyl sulfoxide, 10 millimoles of diethylaluminum chloride, and 12 g. of butadiene at a reaction temperature of 50° C.

As a result, 10.9 g. of cyclododecatriene-(1,5,9) is obtained, yield being 91%.

Example 6

Under the same conditions as those set forth in Example 5, reaction is carried out through the use of 30 g. of a BB fraction which is a mixture of 0.9% propylene, 0.4% methylacetylene, 8% butane, 2% isobutane, 17% butene-1, 28% isobutylene, 6% butene-2, and 37% of butadiene, as the monomer.

As a result, 9.5 g. of cyclododecatriene-(1,5,9) is obtained, yield being 86%, with respect to butadiene supplied.

Example 7

The process of Example 1 is carried with the use of 50 cc. of benzene, 1 millimole of chloropropoxytrichlorotitanium, 0.07 millimole of tributylphosphine oxide, 0.1 millimole of diphenyl sulfoxide, 5 millimoles of diethylaluminum chloride, and 50 g. of a BB fraction of the same composition as that in Example 6.

As a result, 9.4 g. of cyclododecatriene-(1,5,9) is obtained, yield being 85%.

Example 8

The process of Example 1 is carried out with the use of 50 cc. of benzene, 1 millimole of chloropropoxytrichlorotitanium, 0.1 millimole of triethylphosphine oxide, 0.3 millimole of diethylsulfoxide, 10 millimoles of ethylaluminum sesquichloride, and 30 g. of a BB fraction of the same composition as that in Example 6 and with a reaction temperature of 60° C.

As a result, 9.65 g. of cyclododecatriene-(1,5,9) is obtained, yield being 87%.

Example 9

The process of Example 1 is carried out with the use of 50 cc. of toluene, 1 millimole of di-(chloropropoxy)dichlorotitanium, 0.1 millimole of tricresylphosphine oxide, 0.3 millimole of diethyl sulfoxide, 5 millimoles of ethylaluminum sesquichloride, and 12 g. of butadiene and with a reaction temperature of 70° C.

As a result, 10.8 g. of cyclododecatriene-(1,5,9) is obtained, yield being 90%.

Example 10

The process of Example 1 is carried with the use of 50 cc. of toluene, 1 millimole of dichloropropoxytrichlorotitanium, 0.3 millimole of triphenylphosphine oxide, 0.6 millimole of dimethyl sulfoxide, 5 millimoles of diethylaluminum chloride, and 12 g. of butadiene with a reaction temperature of 50° C.

As a result, 10.6 g. of cyclododecatriene-(1,5,9) is obtained, yield being 88%.

In an instance of practice wherein the above process was carried out without the triphenylphosphine oxide, 9.1 g. of cyclododecatriene-(1,5,9) was obtained, yield being 76%.

Example 11

The process of Example 1 is carried out with the use of 50 cc. of toluene, 1 millimole of di-(chlorobutoxy)dichlorotitanium, 0.1 millimole of triphenylphosphine oxide, 0.2 millimole of dimethyl sulfoxide, 8 millimoles of di-isobutylaluminum chloride, and 12 g. of butadiene and with a reaction temperature of 70° C.

As a result, 10.4 g. of cyclododecatriene-(1,5,9) is obtained, yield being 87%.

Example 12

The process of Example 1 is carried out with the use of 50 cc. of benzene, 1 millimole of chlorododecenyltrichlorotitanium, 0.2 millimole of triphenylphosphine oxide, 0.4 millimole of dimethyl sulfoxide, 10 millimoles of ethylaluminum sesquichloride, and 12 g. of butadiene.

As a result, 10.3 g. of cyclododecatriene-(1,5,9) is obtained, yield being 86%.

Example 13

The process of Example 1 is carried out with the use of 50 cc. of benzene, 1 millimole of chlorobutoxytrichlorotitanium, 0.2 millimole of tricresylphosphine oxide, 0.2 millimole of dimethyl sulfoxide, 5 millimoles of diethylaluminum chloride, and 15 g. of isoprene.

As a result, 10 g. of trimethylcyclododecatriene of a fraction of a boiling point from 80 to 100° C. at 2.5 mm. Hg is obtained, yield being 67%.

Example 14

The process of Example 1 is carried out with the use of 50 cc. of benzene, 1 millimole of di-(chloropropoxy)dichlorotitanium, 0.2 millimole of tributylphosphine oxide, 0.2 millimole of dimethyl sulfoxide, 5 millimoles of di-ethylaluminum chloride, and 15 g. of pentadiene.

As a result, 8.6 g. of trimethylcyclododecatriene is obtained, yield being 57%.

Example 15

The process of Example 1 is carried out with the use of 50 cc. of benzene, 1 millimole of chlorobutoxytrichlorotitanium, 0.1 millimole of tricresyl phosphate, 0.3 millimole of dimethyl sulfoxide, 5 millimoles of diethylaluminum chloride, and 12 g. of butadiene.

As a result, 10.4 g. of cyclododecatriene-(1,5,9) is obtained, yield being 87%.

Example 16

The process of Example 1 is carried out with the use of 50 cc. of toluene, 1 millimole of chloroethoxytrichlorotitanium, 0.1 millimole of tributyl phosphate, 0.3 millimole of dimethyl sulfoxide, 10 millimoles of diethylaluminum chloride, and a mixture of 14 g. of butadiene and 7 g. of pentadiene.

As a result, 15.5 g. of a cyclic trimer fraction of a boiling point of from 50 to 100° C. at 2 mm. Hg is obtained, yield being 74%. The composition of this trimer fraction is as follows.

|  | Percent |
| --- | --- |
| Methylcyclododecatriene | 56 |
| Dimethylcyclododecatriene | 1 |
| Cyclododecatriene | 43 |

Example 17

In an instance of practice, the process of Example 10 was carried out without the use of the triphenylphosphine oxide, whereupon 9.1 g. of cyclododecatriene-(1,5,9) was obtained, yield being 76%.

Example 18

An autoclave of 500 cc. capacity is purged with nitrogen, and charged with 100 cc. of benzene, 0.288 g. of chlorocyclohexenoxytitanium trichloride, 0.606 g. of diethylaluminum chloride, 0.026 g. of triphenyl phosphate, and 0.064 g. of dimethylsulfoxide. The resulting mixture is then agitated.

To the thus prepared mixture, 60 g. of BB fraction is then introduced and agitated for 2 hours at 75° C. The composition of the BB fraction is: 1,3-butadiene 37%, butane+butene 62.1%, allen 0.2%, methylacetylene 0.1%, ethylacetylene 0.1%, and vinyl acetylene 0.4%.

Thereafter, methanol is added to the process material to decompose the catalyst.

14.9 g. of a cyclododecatriene-(1,5,9) fraction having a boiling point of 235 to 250° C. and having a purity of 99.6% is obtained out of the process material by distillation. Yield of the pure CDT produced is 67.1 percent with respect to the butadiene charged.

Example 19

The procedure according to that of Example 18 is followed except for the use of 0.314 g. of chlorocyclooctenoxytitanium trichloride for the titanium compound.

As a result, 15.4 g. of a CDT fraction of 99.1% purity is obtained. Yield is 73%.

Example 20

The process set forth in Example 18 is carried out with the use of 0.274 g. of chlorocyclopentenoxytitanium trichloride for the titanium compound.

As a result, 15.0 g. of a CDT fraction of 99.4% purity is obtained. Yield is 67.2%.

Example 21

The process set forth in Example 18 is carried out with the use of 100 cc. of toluene, 0.288 g. of chlorocyclohexenoxytitanium trichloride, 0.606 g. of diethylaluminum chloride, 0.02 g. of tributylphosphine oxide, 0.07 g. of diphenyl sulfoxide, and the same BB fraction as that used in Example 18.

As a result, 14.1 g. of a CDT fraction of 99.1% purity is obtained. Yield is 63%.

Example 22

The process set forth in Example 18 is carried out with the use of 100 cc. of toluene, 0.40 g. of di(chlorocyclooctenoxy) titanium dichloride, 0.03 g. of triphenylphosphine, 0.07 g. of dimethyl sulfoxide, 0.7 g. of diethylaluminum chloride, and 60 g. of the same BB fraction as that in Example 18.

As a result, 13.9 g. of a CDT fraction of 99.2% purity is obtained. Yield is 62%.

Example 23

The process of Example 18 is carried with the use of 100 cc. of toluene, 0.314 g. of chlorocyclooctenoxytitanium trichloride, 0.035 g. of tricresylphosphate, 0.06 g. of dimethyl sulfoxide, 1.12 g. of ethylaluminum sesquichloride, and 60 g. of a BB fraction of the same composition as that in Example 18.

As a result, 13.6 g. of a CDT fraction of 98.7% purity is obtained. Yield is 60.5%.

What is claimed is:

1. A process for producing cyclic trimers of 1,3-dienes which comprises carrying out cyclic trimerization of a 1,3-diene by causing the same to contact a catalyst system comprising, in combination:

a titanium compound (I) representable by the general formula $Ti(O-R-Cl)_nCl_{4-n}$, where R is a member selected from the group consisting of alkylene, cycloalkylene, chloroalkylene, and chlorocycloalkylene groups of from $C_2$ to $C_{15}$, wherein the oxygen (O) and chlorine (Cl) atoms are separated by a carbon bridge containing two carbon atoms, and $n$ is an integer less than 3;

an organoaluminum compound (II) representable by the general formula $AlR'_mCl_{3-m}$, where R' is an alkyl group of from $C_1$ to $C_{10}$, and $m$ is a number selected from the group consisting of 3 and 1.5; and an additive (III) which is a member selected from the group consisting of sulfoxides (III–1) each representable by the general formula $SOR''_2$, where R'' is a member selected from the group consisting of alkyl and aralkyl groups of from $C_1$ to $C_{10}$, and mixtures of a sulfoxide (III–1) and a phosphine oxide (III–2) representable by the general formula $POR'''_3$, where R''' is a member selected from the group consisting of alkyl, aralkyl, and alkoxy groups of from $C_1$ to $C_{10}$.

2. A process for producing cyclic trimers of 1,3-dienes according to Claim 1 in which said titanium compound (I) is representable by the general formula $$Ti(O-R-Cl)_nCl_{4-n}$$

where R is a member selected from the group consisting of alkylene and chloroalkylene groups of from $C_2$ to $C_{15}$ wherein the oxygen (O) and chlorine (Cl) atoms are separated by a carbon bridge containing two carbon atoms, and $n$ is an integer less than 3.

3. A process for producing cyclic trimers of 1,3-dienes according to Claim 1 in which said titanium compound (I) is representable by the general formula $$Ti(O-R-Cl)_nCl_{4-n}$$

where R is a member selected from the group consisting of cycloalkylene and chlorocycloalkylene groups of from $C_4$ to $C_8$ wherein the oxygen (O) and chlorine (Cl) atoms are separated by a carbon bridge containing two carbon atoms, and $n$ is an integer less than 3.

4. A process for producing cyclic trimers of 1,3-dienes according to Claim 1 in which the mole ratio aluminum compound (II)/titanium compound (I) is from 1 to 100, and the mole ratio sulfoxide (III–1)/titanium compound (I) is from 0.01 to 4.

5. A process for producing cyclic trimers of 1,3-dienes according to Claim 1 in which the mole ratio aluminum compound (II)/titanium compound (I) is from 1 to 100, the mole ratio phosphine oxide (III–2)/sulfoxide (III–1) is from 0.1 to 10, and the mole ratio (phosphine oxide (III–2)+sulfoxide (III–1))/titanium compound (I) is from 0.01 to 4.

6. A process for producing cyclic trimers of 1,3-dienes according to Claim 1 in which the 1,3-diene is butadiene, and the cyclic trimer of 1,3-dienes is cyclododecatriene-1,5,9.

7. A process for producing cyclic trimers of 1,3-dienes according to Claim 6 in which the butadiene is in the form of a mixture thereof with butenes.

8. A process for producing cyclic trimers of 1,3-dienes according to Claim 1 in which the 1,3-diene is a methyl-substituted butadiene, and the cyclic trimer of 1,3-dienes is a methyl-substituted cyclododecatriene-1,5,9.

9. A process for producing cyclic trimers of 1,3-dienes according to Claim 1 in which the 1,3-diene is a mixture of butadiene and a methyl-substituted butadiene, and the cyclic trimer of 1,3-dienes is a mixture of cyclododecatriene-1,5,9 and a methyl-substituted cyclododecatriene-1,5,9.

References Cited

UNITED STATES PATENTS

| 3,644,548 | 2/1972 | Takanasi et al. | 260—666 B |
| 3,641,187 | 2/1972 | Furukawa et al. | 260—666 B |
| 3,642,924 | 2/1972 | Morikawa | 260—666 B |

OTHER REFERENCES

Hine, "Physical Organic Chemistry," 2nd ed., McGraw-Hill Book Co., Inc., N.Y. (1962), pp. 60–61.

DANIEL E. WYMAN, Primary Examiner

P. F. SHAVER, Assistant Examiner

U.S. Cl. X.R.

252—429 A, 429 B, 431 P, 431 R